US006579395B1

(12) United States Patent
Smith

(10) Patent No.: US 6,579,395 B1
(45) Date of Patent: Jun. 17, 2003

(54) TRANSFERS

(75) Inventor: Robert William Smith, Stoke-On-Trent (GB)

(73) Assignee: Polycarta Limited (GB)

( * ) Notice: Subject to any disclaimer, the term of this patent is extended or adjusted under 35 U.S.C. 154(b) by 0 days.

(21) Appl. No.: 09/397,277

(22) Filed: Sep. 16, 1999

(30) Foreign Application Priority Data

Sep. 19, 1998 (GB) ............................................ 9820352

(51) Int. Cl.[7] ................................................ B32B 31/20

(52) U.S. Cl. ................................ 156/89.24; 156/89.11; 156/230; 156/235; 156/238; 156/240; 156/277; 156/289

(58) Field of Search ................................ 156/155, 230, 156/234, 235, 236, 238, 239, 240, 247, 249, 89.11, 89.24, 89.23, 277; 427/147, 148, 149; 428/195, 200, 201, 202, 203, 204, 210, 211, 914

(56) References Cited

U.S. PATENT DOCUMENTS

| | | | | | |
|---|---|---|---|---|---|
| 2,629,679 | A | * | 2/1953 | Rathke | |
| 3,007,829 | A | * | 11/1961 | Akkeron | |
| 3,128,197 | A | * | 4/1964 | Gobel | |
| 3,215,575 | A | * | 11/1965 | Gobel | |
| 3,616,015 | A | * | 10/1971 | Kingston | 156/240 X |
| 3,791,841 | A | * | 2/1974 | Carmellini et al. | |
| 3,857,746 | A | * | 12/1974 | Blanco et al. | 156/240 X |
| 3,860,471 | A | * | 1/1975 | Blanco et al. | |
| 3,894,167 | A | * | 7/1975 | Kluge et al. | 156/240 X |
| 3,898,362 | A | * | 8/1975 | Blanco | 428/914 X |
| 3,900,643 | A | * | 8/1975 | Kluge et al. | |
| 3,907,974 | A | * | 9/1975 | Smith | 156/240 X |
| 3,981,761 | A | * | 9/1976 | Kojima et al. | 156/235 X |
| 4,126,728 | A | * | 11/1978 | Holleran et al. | 428/914 X |
| 4,294,641 | A | * | 10/1981 | Reed et al. | 156/240 X |
| 4,322,467 | A | * | 3/1982 | Heimbach et al. | 156/240 X |
| 4,748,071 | A | * | 5/1988 | Wild et al. | 428/914 X |
| 4,888,230 | A | * | 12/1989 | Cutright | 156/240 X |
| 5,069,954 | A | * | 12/1991 | Cole et al. | |
| 5,229,201 | A | * | 7/1993 | Blanco | 428/914 X |
| 5,328,535 | A | * | 7/1994 | Blanco | 156/240 X |
| 5,432,258 | A | | 7/1995 | Yoshimura | |
| 5,552,231 | A | * | 9/1996 | Talvalkar et al. | |
| 5,750,299 | A | * | 5/1998 | Ohshima et al. | |
| 5,948,471 | A | * | 9/1999 | Zimmer | 428/914 X |
| 6,110,632 | A | * | 8/2000 | Dunford et al. | |

FOREIGN PATENT DOCUMENTS

| | | | |
|---|---|---|---|
| EP | 0 276 965 | | 8/1988 |
| GB | 1 205 391 | | 9/1970 |
| GB | 2151189 | * | 7/1985 |
| JP | 58 087086 | | 5/1983 |
| WO | WO 97 00781 A | | 1/1997 |
| WO | 98/01793 | * | 1/1998 |

OTHER PUBLICATIONS

Patent Abstracts of Japan, vol. 007, No. 187 (M–236) Aug. 16, 1983.

* cited by examiner

*Primary Examiner*—Curtis Mayes
(74) *Attorney, Agent, or Firm*—Watts, Hoffman, Fisher & Heinke Co., L.P.A.

(57) ABSTRACT

A method of producing a water slide transfer, whereby a design is formed on a backing paper with a soluble release layer thereon, a covercoat is formed on a release paper, one combination is caused by placing the two papers on top of each other with the covercoat adjacent the design, with heat and/or pressure being applied such that the covercoat locates onto the design and can be freed from the release paper.

31 Claims, No Drawings

TRANSFERS

This invention comprises a method of producing transfers, particularly but not exclusively water slide transfers and especially firable transfers for use on ceramics, and also a method of decorating articles with such transfers.

Water slide transfers as used in the decoration of ceramics, glass, coated metals and plastics material and the like, commonly comprise a design formed from an ink system printed on to a water slide base paper, with an overprint of a covercoat. The base paper is water permeable and provided with a water soluble release layer to permit the design to be freed therefrom. The covercoat holds the print together and also provides some strength to the decal for handling. Typically the covercoats are solvent based and are printed by the screen process. During drying of the covercoats a considerable amount of solvent will evaporate therefrom. In order to maintain acceptable working conditions and meet the relevant legislation, it is necessary for the solvents produced to be extracted. This can produce considerable problems for the transfer producers, and the situation is likely to become more difficult as legislation becomes tighter.

Digital printing using techniques such as electrophotographic, ink jet, thermal wax and dye sublimation, has enabled the economic production of one off or short run transfer prints. However for water slide transfers a covercoat is still required to hold the transfer together. With overprinting of the covercoat this can be prohibitive for one off and short runs, therefore restricting the exploitation of digital technology for water slide transfers. Moreover, the overprinting of covercoat can lead to solvent attack of the inks, therefore restricting the choice of inks.

According to a first aspect of the invention there is provided a method of producing a water slide transfer, the method comprising forming a design on a backing paper with a soluble release layer thereon, forming a covercoat on a release paper, causing combination by placing the two papers on top of each other with the covercoat adjacent the design, and applying heat and/or pressure thereto such that the covercoat locates onto the design and can be freed from the release paper.

According to a second aspect of the invention there is provided a method of producing a water slide transfer, the method comprising forming a covercoat on a release paper, forming a design on the covercoat, causing combination with a backing paper with a soluble release layer by placing the two papers on top of each other with the design adjacent the release layer, and applying heat and/or pressure thereto such that the design and covercoat locate on the backing paper and can be freed from the release paper.

According to a third aspect of the invention there is provided a method of producing a transfer, the method comprising forming a covercoat on a release paper and forming a design on the covercoat.

The combination is preferably achieved by passing the two papers under a roller, which roller is preferably heated. The two papers may be passed between two rollers, which are desirably heated nip rollers. The, one or both of the rollers may be heated to a temperature of between 80 and 200° C., and desirably between 110° and 160°.

The covercoat preferably has a composition which softens during said heating. The covercoat preferably comprises a thermoplastics material and desirably a methacrylate resin or a cellulose derivative. The covercoat is preferably between 15 and 30 $\mu$m thick, and may be applied to the release paper by screen printing.

The release paper preferably comprises a release layer, which may comprise polyethylene, polypropylene, a fluorocarbon or a chromium complex, e.g. Quilon (registered trade mark—DuPont).

The design is preferably digitally printed. The design preferably incorporates inorganic colour pigments, and these may be applied within the toner system of an electrophotographic printer. In the second or third embodiments the design may be printed upon the covercoat.

The covercoat may incorporate a flux, and the flux may comprise up to 80% by weight of the covercoat. The flux may be a ceramic flux which melts at a temperature between 500 and 900° C. The covercoat may be formed as a continuous layer, or may be provided on discrete parts of the release paper.

The invention also provides a method of producing a firable transfer according to any of the preceding nine paragraphs.

The invention further provides a water slide transfer made by a method according to any of the preceding ten paragraphs.

The invention still further provides a covercoat on a release paper according to any of said preceding ten paragraphs.

The invention yet further provides a method of decorating an article, the method comprising producing a transfer according to any of said ten preceding paragraphs, and applying the transfer to the article. With the first two embodiments water is preferably applied to the transfer to free the backing paper therefrom.

In the case of a firable article, the article is preferably fired subsequent to application of the transfer thereon.

An embodiment of the present invention will now be described by way of example only.

A water slide transfer for application onto a ceramic article is formed as follows. A design is printed on to lightweight (110 gsm) water slide paper with a water soluble adhesive thereon. The design is printed with an electrophotographic printer with inorganic colour pigments within the toner system.

A covercoat material such as Ceramvetro 440 comprising a methacrylate resin, and a ceramic flux such as H34009 from Heraeus or 10169 from Cerdec. This mixture is screen printed on to a release paper with a polyethylene release layer.

The two papers are placed on top of each other with the covercoat layer adjacent the design layer. The combination is passed through a pair of heated nip rollers operating at a temperature between 110° C. and 160° C. This causes the covercoat material to soften and adhere on to the design. Once the papers have passed through the rollers the release paper can be peeled off to provide a water slide transfer on the base paper.

This transfer can be released from the base paper by placing in water and subsequently placed on an article and then fired. The provision of the flux in the covercoat material provides for a gloss finish which otherwise may not be possible with designs printed this way.

Using this method the covercoat material can be printed on to the release paper by screen printing in a large scale operation. This release paper can then be cut to size and used for individual short run operations. This therefore permits the flexibility of digital printing to be utilised in water slide transfers. The invention enables designs to be scanned, manipulated, printed and covercoated in a fraction of the time required by conventional means. The transfers can also be printed on demand eliminating the need for an inventory of printed decals.

Various modifications may be made without departing from the scope of the invention. For instance different base papers and release papers could be used. The release paper could be provided with a release layer of polypropylene, a fluorocarbon or a chromium complex such as Quilon (registered trade mark—DuPont). The covercoat may be a continuous coating or may be pattern printed for standard layouts such as collector plates, donuts, sprays, backstamps etc. Pattern printing obviates the need for cutting around the decal before application.

In a further embodiment the covercoated release paper may be printed directly, either digitally or by conventional means. The printed covercoat can then be transferred to a water slide base as described previously, and after peeling away the release paper the product may then be used as a normal water slide transfer. Alternatively when images are printed directly onto the covercoat layer, the decal may be transferred directly to the substrate for decoration. This may be achieved by means of heat and pressure similar to those conditions employed during the above transfer process.

Different materials could be used in the covercoat layer. Rather than a methacrylate resin it may be possible to use a cellulose derivative. Different fluxes could be used and in some instances fluxes need not be required. Different materials could be used in the design, dependent on what decoration or other design is required and also upon the final substrate for receiving the transfer and what subsequent firing if necessary will take place. A different combination method or apparatus could be used, and different temperatures may be applicable to release the covercoat. Such release temperatures would generally be within the range 80–200° C.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A method of producing a water slide transfer, said method comprising forming a covercoat on a release paper, forming a design on the covercoat, providing a backing paper with a soluble release layer, causing combination by placing said two papers on top of each other with said design adjacent said release layer, and applying heat and/or pressure to said combination such that said design and said covercoat locate on said backing paper and said covercoat can be freed from said release paper.

2. A method according to claim 1 wherein said combination is achieved by passing said two papers under a roller.

3. A method according to claim 2, wherein said roller is heated.

4. A method according to claim 2, wherein said roller is heated to a temperature of between 80° C. and 200° C.

5. A method according to claim 4, wherein said roller is heated to a temperature of between 110° C. and 160° C.

6. A method according to claim 1 wherein said two papers are passed between two rollers.

7. A method according to claim 1 wherein said design is printed on said covercoat.

8. A method of producing a water slide transfer, said method comprising a backing paper with a soluble release layer on one side thereof, forming a design on said side of the backing paper, forming a covercoat on a release paper by screen printing, causing a combination by placing said two papers on top of each other with said covercoat facing said design, and applying heat and pressure to said combination such that said covercoat adheres onto said backing paper and said release paper can subsequently be peeled off from said covercoat to form a transfer on the backing paper.

9. A method according to claim 8, wherein said covercoat consists of a composition which softens during hearing.

10. A method according to claim 8, wherein said covercoat.

11. A method according to claim 10, wherein said thermoplastics material comprises a methacrylate resin or a cellulose derivative.

12. A method according to claim 8, wherein said covercoat is 15 and 30 μm thick.

13. A method according to claim 8, wherein said release paper comprises a release layer.

14. A method according to claim 13, wherein said release layer comprises polyethylene, polypropylene, a fluorocarbon or a chromium complex.

15. A method according to claim 8, wherein said design is digitally printed.

16. A method according to claim 8, wherein said design incorporated inorganic color pigments.

17. A method according to claim 16, wherein said inorganic colour pigments are applied within a toner system of an electrophotographic printer.

18. A method according to claim 8, wherein said covercoat incorporates a flux.

19. A method according to claim 18, wherein said flux comprises up to 80% by weight of said covercoat.

20. A method according to claim 18, wherein said flux consists of a ceramic flux which melts at a temperature between 500 and 900° C.

21. A method according to claim 8, wherein said covercoat is formed as a continuous layer.

22. A method according to claim 8, wherein said covercoat is provided on discrete parts of said release paper.

23. A method according to claim 8, wherein said combination is achieved by passing said two papers under a roller.

24. A method according to claim 23, wherein said roller is heated.

25. A method according to claim 8, wherein said two papers are passed between two rollers.

26. A method of producing a transfer according to claim 8, wherein the transfer is firable.

27. A method of decorating an article, the method comprising producing a transfer according to claim 8, and applying said transfer to said article.

28. A method of decorating an article according to claim 27, wherein said article is fired subsequent to application of said transfer on said article.

29. A method of decorating an article using a transfer according to claim 8 wherein water is applied to said transfer to free said backing paper from said transfer.

30. A method of producing a water slide transfer, said method comprising providing a backing paper with a soluble release layer on one side thereof, forming a design on said side of the backing paper by applying inorganic colour pigments within a toner system of an electrophotographic printer, forming a covercoat on a release paper, causing combination by placing said two papers on top of each other with said covercoat facing said design, and passing said two papers between two rollers, with at least one of said rollers heated to a temperature of between 80 degrees Celsius and 200 degrees Celsius, such that said covercoat adheres onto said backing paper to form a transfer, and said covercoat can subsequently be peeled off from said release paper.

31. A method according to claim 30, wherein said roller is heated to a temperature of between 110 degrees Celsius and 160 degrees Celsius.

* * * * *

UNITED STATES PATENT AND TRADEMARK OFFICE

CERTIFICATE OF CORRECTION

PATENT NO. : 6,579,395 B1
DATED : June 17, 2003
INVENTOR(S) : Robert William Smith It is certified that error appears in the above-identified patent and that said Letters Patent is hereby corrected as shown below:

Column 4,
Line 5, should read:
-- A method according to claim 10 wherein said overcoat comprises a thermal plastics material. --

Signed and Sealed this

Twenty-third Day of December, 2003

JAMES E. ROGAN
*Director of the United States Patent and Trademark Office*